Jan. 9, 1934.  H. C. HART  1,942,962

AUTOMATIC LOCK FOR WINDOW OPERATORS

Filed Feb. 7, 1931

INVENTOR:
Howard C. Hart,
BY
E. T. Silvius
ATTORNEY.

Patented Jan. 9, 1934

1,942,962

UNITED STATES PATENT OFFICE 1,942,962

AUTOMATIC LOCK FOR WINDOW-OPERATORS

Howard C. Hart, Russiaville, Ind.; Effe Hart administratrix of said Howard C. Hart, deceased Application February 7, 1931. Serial No. 514,137

2 Claims. (Cl. 192—8)

This invention relates generally to apparatus commonly known as a window-operator whereby plate glass window panes of motor vehicles are adjusted and normally held in adjusted positions, the invention having reference more particularly to means for automatically locking the window-operator to prevent movement of the window pane otherwise than intended by means of the mechanical window-operator.

An object of the invention is to provide a simple and substantial locking apparatus for window-operators of the type that is actuated by means of a crank and gearing, an aim being to prevent persons on the outside of a locked vehicle body from lowering a window pane and reaching over the top thereof to open a door, especially to prevent access to the interior of a vehicle body over the top of a lowered window pane.

Another object is to provide a window-operator with locking apparatus which shall be of simple and reliable construction and permitting a window pane to be so mounted as to be easily operated and yet prevented from gradually descending because of vibrations of the vehicle body incidental to operations of the motor vehicle.

A further object is to provide means for the protection of a motor vehicle against the injury or damages that might result from the entrance of persons into the vehicle body when left alone or unguarded.

A further object is to provide an improved automatic window-operator lock which shall be of such construction as to operate reliably and quietly and shall be durable and economical in use.

With the above-mentioned and other objects in view, the invention consists in novel means for operating and controlling a window pane and preventing movement of the pane otherwise than by means of the operating apparatus; the invention consisting also further in a novel spring clutch and application thereof to a window-operator, and in the parts and combinations and arrangements of parts, as hereinafter particularly described and further defined in the claims appended hereto.

Figure 1:
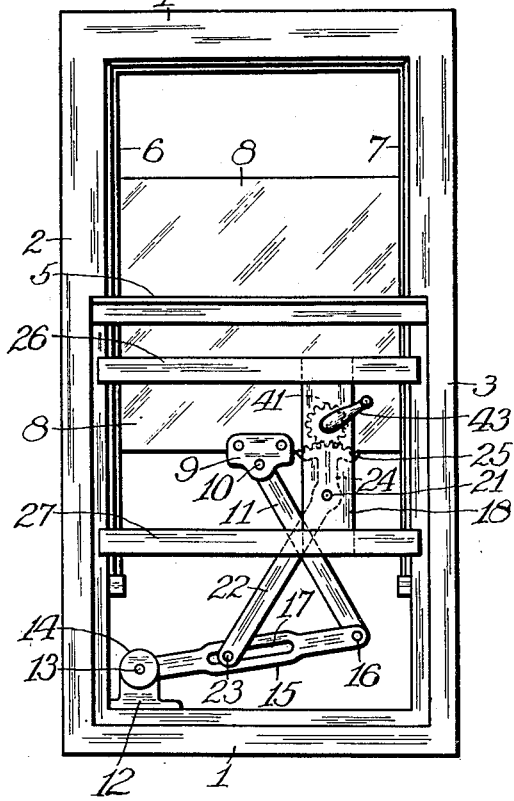
Figure 3:
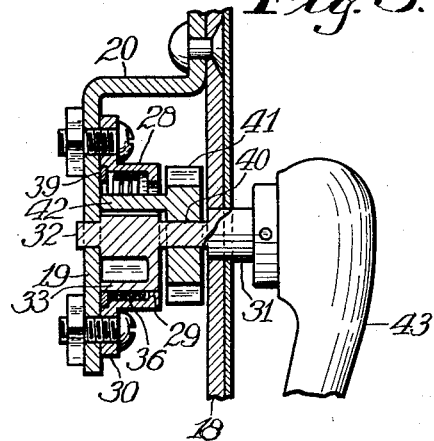
Figure 4:
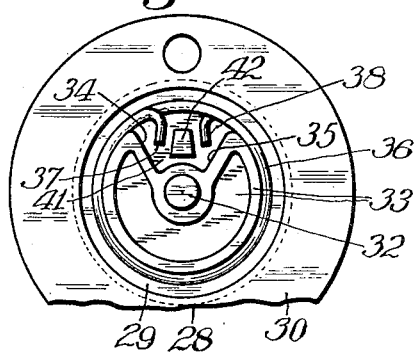
Figure 2:
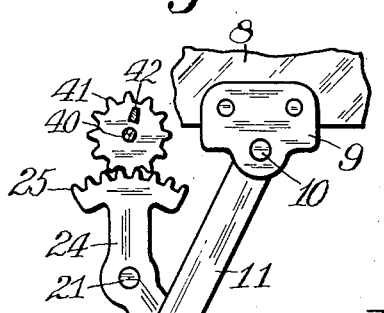
Figures 5, 6:
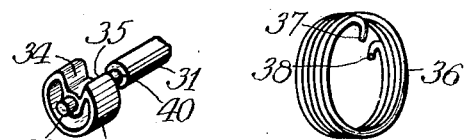
Figure 7:
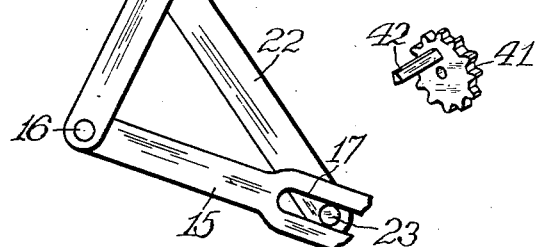

Referring to the accompanying drawing,—Figure 1 is an elevation showing the inner side of a door or a panel structure suitable for a closed-top automobile to which the invention is applied in one form, the usual covering of the structure being omitted; Fig. 2 is an enlarged view of gearing apparatus in a reverse order relatively to the preceding view; Fig. 3 is a fragmentary vertical section of the operating and controlling gearing to which the automatic locking apparatus is applied; Fig. 4 is a plan view of an assembly of parts of the improved apparatus; Fig. 5 is a perspective view of one of the novel clutch controlling devices; Fig. 6 is a perspective view of the spring clutch comprised in the operator gearing lock; and Fig. 7 is a perspective view of a novel gear comprised in the invention.

Similar reference characters in the different figures of the drawing indicate corresponding elements or features of construction herein referred to in detail.

One form of window-operator is shown to which the invention is advantageously applied and in association with an automobile body, for explanatory purposes, the drawing showing a main frame which may be variously constructed as a door frame or a window frame for various structures, particularly in closed-top automobiles, as an example the frame comprising a bottom rail 1, posts 2 and 3 and a top rail 4 suitably connected to constitute a rectangular frame which has an intermediate member 5 connected to the posts to constitute a window sill through which guides 6 and 7 extend that are applied to the posts 2 and 3 respectively and afford slide ways which guide a plate glass window pane 8 in a preferably conventional manner. The lower portion of the window pane has a bracket 9 secured thereto by which a pivot 10 is operatively applied to the pane and connects a link 11 thereto. A pivot stand 12 is mounted in the lower portion of the main frame and supports a pivot 13 and a counter-balance device 14 for a controlling lever 15 which is supported at one end by the pivot, the lever having a pivot 16 on its opposite end to which the link 11 is connected. The lever 15 preferably has a longitudinal slot 17 therein which is suitable for making a shifting connection of cam-like properties. Other frame parts suitably comprise vertical plates 18 and 19 suitably spaced apart and secured one to another by a suitable tie bar 20, the inner one of the plates rigidly supporting a pivot 21 on which an operating lever is supported between its ends so as to have an arm 22 extending downward and shiftably connected to the arm 15 by means of a pin 23, the operating lever having a relatively shorter arm 24 extending upward and having a curved rack-bar 25 fixed on its end. Preferably the inner plate 18 is directly supported by two horizontal rails 26 and 27 which are supported by the posts 2 and 3.

A preferred form of construction of the invention comprises a suitably bored cylindrical clutch box 28 having an inwardly extending annular head portion 29 in one end and a flange 30 on its opposite end which is secured to the outer plate 19, and an operating shaft having a head portion 31 journaled in the inner plate 18, the shaft extending through the clutch box and having a journal member 32 rotatably guided in the plate 19. The shaft has a cylindrical core 33 fixed thereto within the clutch box and it preferably is cored out to eliminate useless metal, and the core has a longitudinal peripheral recess affording two opposite engagement walls or abutments 34 and 35 radially disposed. A spring clutch is provided which has a number of coils 36 extending about the core and adapted to have frictional engagement with the inner side of the wall of the clutch box 28, the end coils having inwardly extending lugs 37 and 38 thereon, the lugs being turned at acute angles relatively to the coils so as to project towards the wall portions respectively of the core. Preferably a filling washer 39 is placed in the back of the clutch box to retain the lugs in proper position to be engaged by the core walls. The operating shaft has a journal portion 40 outside the clutch box on which a pinion or small toothed wheel 41 is rotatably supported to mesh with the rack-bar 25, so that movement of the rack-bar results from movement of the pinion by the operating shaft. To enable the operating shaft to turn the pinion and thereby move the rack-bar the pinion is provided on one side thereof with a lug finger 42 that extends into the space between the core walls 34 and 35 and between the clutch lugs 37 and 38, so that rotation of the pinion follows rotary movement of the core fixed to the operating shaft, the operating shaft being provided with a crank 43 which being arranged on the inside of the automobile body provides for normal operation and adjustment of the window pane.

In practical use, to move the window pane the crank 43 is turned as customarily, and with the equipment described the operating shaft is turned in the appropriate direction until one wall, 35 for instance is brought into engagement with the lug 38 of the clutch and causes the clutch coils to be drawn inward and released from operative contact with the wall of the clutch box, the lug 38 being carried to the finger 42 and thus causing rotation of the pinion which in turn causes movement of the rack-bar that operates the different levers and the link 11 which directly moves the window pane. In case attempt is made to lower the window pane by manually forcing it downward and thereby moving the window-operator idly such action results in movement of the rack-bar 25 and slight rotary movement of the pinion 41 until the lug finger 42 is carried to the opposite clutch lug, 37 for instance, resulting in the lug and the spring coil being forced out against the wall of the clutch box, upon which clutch action occurs and locking of the pinion resulting and preventing effective movement of the window pane which results from stoppage of the movement of the rack-bar and the operating lever, unlocking action occurring only upon the normal operation of the crank 43, all the locking and unlocking operations automatically occurring upon appropriate operation of the crank.

What is claimed is:

1. In a window-operator mechanism, the combination of a rotary operating shaft having a radial abutment, a pinion loose on the shaft and having a lateral lug finger fixed on one side and guided thereby free from the abutment, the shaft having a crank fixed thereto spaced from the opposite side of the pinion normally to turn the pinion, and clutch means automatically controlled to operate by action of the lug finger relatively to the abutment upon initial turning of the pinion by abnormal movement thereof.

2. In a window-operator mechanism, the combination of two vertical plates fixedly spaced apart, a bored cylindrical clutch box arranged between said plates and having an inwardly extending annular head portion in one end and a flange on its opposite end secured to the outer one of said plates, an operating shaft having a head portion journaled in the opposite one of said plates, the shaft extending through the clutch box and having a journal member rotatably guided in the outer one of said plates and having a cylindrical core fixed therto within the clutch box, the core having a longitudinal peripheral recess with opposite radial engagement walls, a coiled spring extending about said core to co-operate with said clutch box and having acute-angled lugs on its opposite ends loosely extending into said recess to be alternatively engaged by said walls respectively, and a pinion journaled on the shaft and having a lug finger fixed on one side thereof and extending through said annular head portion and into said recess and loosely between said acute-angled lugs for co-operation separately therewith.

HOWARD C. HART.